(12) United States Patent
Choi et al.

(10) Patent No.: US 7,652,734 B2
(45) Date of Patent: Jan. 26, 2010

(54) ARRAY SUBSTRATE FOR A REFLECTIVE LIQUID CRYSTAL DISPLAY DEVICE AND MANUFACTURING METHOD FOR THE SAME

(75) Inventors: Su-Seok Choi, Gyeonggi-do (KR); Hyun-Suk Jin, Youngdo-gu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/325,846

(22) Filed: Dec. 23, 2002

(65) Prior Publication Data

US 2003/0123003 A1 Jul. 3, 2003

(30) Foreign Application Priority Data

Dec. 28, 2001 (KR) .................. 10-2001-0087530

(51) Int. Cl.
*G02F 1/1333* (2006.01)
*G02F 1/1335* (2006.01)

(52) U.S. Cl. ....................... 349/113; 349/114
(58) Field of Classification Search ......... 349/113–114, 349/61, 67; 359/850–861
See application file for complete search history.

(56) References Cited

U.S. PATENT DOCUMENTS 5,691,791 A * 11/1997 Nakamura et al. ......... 349/113

| | | | | |
|---|---|---|---|---|
| 6,118,507 A | * | 9/2000 | Shigeno et al. | 349/113 |
| 6,163,405 A | * | 12/2000 | Chang et al. | 359/599 |
| 6,166,793 A | * | 12/2000 | Hayashi et al. | 349/113 |
| 6,452,653 B1 | * | 9/2002 | Yamanaka et al. | 349/113 |
| 6,466,280 B1 | * | 10/2002 | Park et al. | 349/43 |
| 6,809,785 B2 | * | 10/2004 | Fujino | 349/114 |
| 2001/0004280 A1 | * | 6/2001 | Kim et al. | 349/187 |
| 2002/0033918 A1 | * | 3/2002 | Shigeno et al. | 349/114 |

FOREIGN PATENT DOCUMENTS

| JP | 2000-105370 | 4/2000 |
|---|---|---|
| KR | 2000-0075120 | 12/2000 |

* cited by examiner

*Primary Examiner*—David Nelms
*Assistant Examiner*—Hoan C Nguyen
(74) *Attorney, Agent, or Firm*—Morgan Lewis & Bockius LLP

(57) ABSTRACT

An array substrate of a reflective liquid crystal display device including gate and data lines on the substrate, a thin film transistor adjacent to where a gate line and a data line cross over each other, wherein the thin film transistor has a gate electrode, a source electrode and a drain electrode, a passivation layer with an uneven surface having curved profiles that are asymmetric over the thin film transistor, and an opaque conductive pixel electrode having a reflective surface with curved profiles that are asymmetric on the passivation layer.

14 Claims, 11 Drawing Sheets

ARRAY SUBSTRATE FOR A REFLECTIVE LIQUID CRYSTAL DISPLAY DEVICE AND MANUFACTURING METHOD FOR THE SAME

This application claims the benefit of Korean Patent Application No. 2001-87530, filed on Dec. 28, 2001 in Korea, which is hereby incorporated by reference in its entirety.

BACKGROUND OF THE INVENTION

1. Field of the Invention

The present invention relates to a reflective liquid crystal display (LCD) device and more particularly, to an array substrate of the reflective liquid crystal display (LCD) device and a manufacturing method for the same.

2. Discussion of the Related Art

The demand for flat panel display devices, which have properties, such as a shallow depth, light weight and low power consumption increases, as the information age rapidly evolves. Flat panel display devices are classified into one of two types of devices depending on whether the devices emit light. One type is a light-emitting type that emits light to display images and the other type is a light-receiving type that controls transmission of an external light source to display images. Plasma display panels (PDPs), filed emission display (FED) devices and electro luminescence (EL) display devices are examples of the light-emitting type of flat panel display devices. Liquid crystal display (LCD) devices are an example of the light-receiving type of flat panel display devices. The liquid crystal display device is widely used in, for example, notebook computers and desktop monitors because of its superior resolution, color rendering capability and high contrast in displaying images.

Generally, a liquid crystal display device has upper and lower substrates, which are spaced apart and face each other. The upper substrate includes at one least electrode and the lower substrate includes a plurality of electrodes. The at least one electrode of the upper substrate faces the electrodes of the lower substrate. Liquid crystal is positioned between the facing electrodes of the upper and lower substrates. A voltage is applied across the liquid crystal via the facing electrodes of the substrates such that alignment of the liquid crystal molecules changes corresponding to the applied voltage to display images.

Because the liquid crystal display device cannot emit light as discussed above, an additional light source is needed to display images. Accordingly, the liquid crystal display device has a back light behind a liquid crystal panel that is used as a light source. An amount of light transmitted through the LCD devices from the back light is controlled according to the alignment of the liquid crystal molecules to display images. The electrodes of each substrate are formed of transparent conductive material and the substrates are formed of a transparent material, such as glass. LCD devices that control the amount of light transmitted from a back light are transmissive liquid crystal display devices. Because the transmissive liquid crystal display device uses an artificial light source, it can display a bright image even in dark surroundings. However, the transmissive liquid crystal display device has high power consumption because of the power needs for the back light.

A reflective liquid crystal display device has been suggested to overcome the power consumption problem of the transmissive liquid crystal display device. A reflective liquid crystal display device controls a transmittance of a light, such as ambient light or artificial light, which is received through the upper substrate and reflected by the lower substrate back through the upper substrate depending upon the alignment of liquid crystal molecules. Accordingly, the reflective liquid crystal display device uses less power than a transmissive liquid crystal device since externally available light or ambient light is used instead of a light source powered by the display device. Unlike the transmissive liquid crystal display device, the electrodes on the lower substrate of the reflective liquid crystal display device are formed of an opaque conductive material that has a high reflectance. The structure of a related art reflective liquid crystal display (LCD) device will be described hereinafter with reference to attached figures.

FIG. 1 is a cross-sectional view of a related art reflective liquid crystal display (LCD) device. As shown in FIG. 1, the reflective liquid crystal device has a lower substrate 11 and an upper substrate 21 that are spaced apart from each other. A gate electrode 12 is formed on the lower substrate 11. A gate insulating layer 13 is formed on the gate electrode 12 and across the surface of the lower substrate 11. A gate line (not shown) is also formed beneath the gate insulating layer 13. An active layer 14 is formed on the gate insulating layer 13 above the gate electrode 12. Ohmic contact layers 15a and 15b are formed on the sides of the active layer 14. A source electrode 16b and a drain electrode 16c are formed on the ohmic contact layers 15a and 15b, respectively. The gate electrode 12, the source electrode 16b and the drain electrode 16c are parts of a thin film transistor T. A data line 16a is formed of same material as that of the source and drain electrodes 16b and 16c on the gate insulating layer 13 and connected to the source electrode 16b.

A pixel region is defined between data lines 16a and 16d and gate lines (not shown) that cross the data lines. A passivation layer 17 is formed over the gate insulating layer 13 and the thin film transistor T. A contact hole 17a formed in the passivation layer 17 exposes a portion of the drain electrode 16c. A pixel electrode 18, such as a conductive reflective electrode, is formed on the passivation layer 17 in the pixel region and connected to the drain electrode 16c through the contact hole 17a. The pixel electrode 18 is formed over the thin film transistor T. The pixel electrode 18 overlaps the data lines 16a and 16d to increase the aperture ratio of the reflective LCD device. The passivation layer 17 can be formed of organic material having a low dielectric constant to prevent signal interference between the pixel electrode 18 and the data lines 16a and 16d.

FIG. 1 also shows a black matrix 22 formed beneath the upper substrate 21. A red color filter 23a, a green color filter 23b and a blue color filter 23c are repeatedly formed beneath the upper substrate 21 and adjacent to the black matrix 22. A common electrode 24 is formed beneath the color filters 23a, 23b and 23c. A transparent conductive material, such as Indium-Tin-Oxide (ITO), is used as a common electrode. Each of the color filters 23a, 23b and 23c corresponds to a pixel electrode 18 on the lower substrate 11. The black matrix 22 overlaps edges of the pixel electrode 18. Because the pixel electrode 18, which is formed of opaque conductive metal material, covers the thin film transistor T, the black matrix 22 does not have to be formed such that it covers the thin film transistor to prevent light from interfering with the active layer 14.

As shown in FIG. 1, a liquid crystal layer 30 is interposed between the pixel and common electrodes 18 and 24. If a voltage is applied across the pixel electrode 18 and common electrode 24, the electric field across the liquid crystal between the pixel electrode 18 and common electrode 24 changes the alignment of molecules in the liquid crystal. Alignment layers (not shown) are formed on the pixel electrode 18 and beneath the common electrode 24 to initially align the molecules of the liquid crystal.

Images are displayed in the reflective liquid crystal display (LCD) device by forming the pixel electrode of material that has a high reflectability such that incident light on the pixel electrode that travels through the upper substrate 21 and the liquid crystal 30 is reflected back through the liquid crystal 30 and the upper substrate 21. Accordingly, the reflective liquid crystal display (LCD) device can display images in bright light conditions with little power consumption. Because the reflective electrode of the reflective liquid crystal display (LCD) device usually has a flat surface, the reflective electrode has a mirror reflection in that an incidence angle and a reflection angle are the same. Accordingly, the luminance of the reflective liquid crystal display device will depend, for a given direction from the device, upon a position of the light source. Therefore, it has been suggested that a reflective liquid crystal display (LCD) device includes a scattering film to scatters the light into many directions such that luminance is not as dependent on the position of the light source.

FIG. 2 is a cross-sectional view of a related art reflective liquid crystal display (LCD) device having a scattering film. FIG. 2 has all of the elements of FIG. 1. Further, FIG. 2 also includes a front scattering film 40 that is formed on the top side of the upper substrate 21, which is opposite to the side of the upper substrate 21 on which the black matrix 22 is formed. However, in case of the front scattering film 40, image blurring can occur due to back scattering of the displayed image from the front scattering film. Thus, the resolution of the displayed is decreased.

FIG. 3 is a cross-sectional view of a related art reflective liquid crystal display (LCD) device having an uneven reflective electrode. FIG. 3 has all of the elements of FIG. 1. However, the pixel electrode 18 in FIG. 3 has an uneven shape to scatter the light. The pixel electrode 18 to is formed to have an uneven surface by depositing it on a passivation layer 17 having an upper portion that is unevenly formed. The unevenness of the pixel electrode 18 varies the angle of reflection across the surface of the pixel electrode such that luminance of the related art reflective liquid crystal display (LCD) device in FIG. 3 is not dependent upon the position of a light source.

FIG. 4 is a graph illustrating light-paths and angles for the related art reflective liquid crystal display (LCD) device having the uneven surface on the pixel electrode. FIG. 4 shows that incident light I from the external environment 55 refracts when it passes through the glass substrate of the upper substrate 54 and the liquid crystal layer 53 and then reflects at a surface of the pixel electrode 52 on the lower substrate 51. The refraction index of the external environment is 1.0. The refraction index for the upper substrate 54 and the liquid crystal layer 53 is considered to be 1.5. The incident light "I" from an external light source comes into the upper substrate 54 with an incidence angle of α (alpha) and refracts as a first internal light II with a refraction angle of β (beta) due to the differences in refraction index between the external environment 55 and the upper substrate 54. Because the refraction indexes of the upper substrate 54 and the liquid crystal layer 53 are same, the first internal light II does not refract at the interface of the liquid crystal layer 53 and the upper substrate 54. The first internal light II comes into the uneven surface of the pixel electrode 52 with an incidence angle of γ (gamma) and then reflects as second internal light III from the uneven surface of the pixel electrode 52 with a reflection angle of γ. The incidence angle of the first internal light II and the reflection angle of the second internal light III are measured with respect to a normal line that is perpendicular to a tangent line of the uneven surface of the pixel electrode 52. The second internal light III goes out through the liquid crystal layer 53 and the upper substrate 54 as out-going light IV without refraction as shown in the FIG. 4 in this case.

The out-going light IV in FIG. 4 should be perpendicular to the surface of the second substrate 54 to increase the luminance of the display in a direction perpendicular to the surface of the upper substrate 54 of the reflective liquid crystal display (LCD) device. Further, the second internal light III also needs to be perpendicular to the upper substrate 54 such that back diffraction does not occur at the interface of the external environment 55 and the upper substrate 54. Because the light source is usually disposed such that incident light I has an incident angle of approximately 30° (degrees) with respect to a vertical direction of the upper substrate 54, usually the refraction angle β, as calculated in accordance with the Snell's law, is about 20° (degrees). Accordingly, the reflection angles γ should be about 10° (degree) so that the reflected second internal light III is perpendicular to the upper substrate 54. An inclination angle θ (theta) of the uneven surface of the pixel electrode 52 should be about 10° (degree) when the reflection angle γ is about 10° (degrees). The inclination angle θ is an angle that is measured between the tangent line of the uneven surface of the pixel electrode 52 and the horizontal direction of the lower substrate 51. Accordingly, it is desirable to form the pixel electrode to have a surface with an inclination angle of approximately 10° (degrees).

FIGS. 5A to 5B are cross-sectional views illustrating a fabricating sequence for curved profiles of an organic insulating layer in a reflective liquid crystal display (LCD) device according to a related art. In FIG. 5A, a plurality of organic film patterns 62 is formed at predetermined intervals by coating organic material on a substrate 61 and then patterning it. Varying the size of the organic film patterns and the interval between the organic films patterns controls an inclination angle of the curved profile that will later be formed. The organic film can be formed of a photosensitive material. Depending on whether the photosensitive material is negative or positive type, a portion of the photosensitive material that is exposed to light or a portion of the photosensitive material that is not exposed to light is removed. The organic film patterns 62 can be formed by coating additional organic material on the passivation layer 17 of FIG. 3 such that the passivation layer is used as a substrate for forming curved profiles. In the alternative, organic film patterns can be formed by patterning an upper portion of the passivation layer 17 of FIG. 3.

Referring to FIG. 5B, an insulating layer 63 that has the curved profiles 63a is formed by heating the organic film patterns 62 shown in FIG. 5A. More particularly, the organic film patterns 62 of FIG. 5A are melted by the heat and then cured to have an inclination angle θ (theta) of approximately 10° (degree). When a conductive material, such as metal, is deposited and then patterned on the insulating layer 63 having the curved profiles 63a to form a pixel electrode having the contour of the curved profiles is formed. However, it is hard to form the curved profiles 63a repeatedly to have the inclination angle θ (theta) of 10° (degree) according to the above process and accordingly the reproducibility is not good.

FIGS. 6A to 6C are cross-sectional views illustrating a fabricating sequence for curved profiles of an organic insulating layer in a reflective liquid crystal display (LCD) device according to another related art. As shown in FIG. 6A, a plurality of organic film patterns 72 is formed on a substrate 71, such as a passivation layer, by coating organic material on the substrate 71 and patterning it. In the alternative, the organic film pattern 72 can be formed by patterning an upper portion of the passivation layer. As shown in FIG. 6B, a first insulating layer 73 having curved profiles 73a is formed by heating the organic film patterns 72 and then curing it. As shown in FIG. 6C, a second insulating layer 74 is formed by coating an organic material on the curved profiles 73a. The inclination angle θ (theta) of the curved profile of the second insulating layer 74 can be controlled to be about 10° (degree) by controlling the curved profile 73a of the first insulating layer 73. Each curved profile of the second insulating layer 74 has a hemispheric shape that is symmetric with respect to a centerline as shown in the FIG. 6C. Because an inclination angle θ (theta) of the curved profiles 73a of the first insulating layer 73 does not need to be about 10° (degree) in this case, the reproducibility of the curved profiles 73a is relatively high compared to the process of FIGS. 5A to 5B.

FIG. 7 is a graph illustrating an effective reflection area of the curved profile of the pixel electrode for the reflective liquid crystal display (LCD) device according to the related art. As stated before, the curved profile of the pixel electrode forms a hemispheric curve. If the light source is positioned at a left side of the reflective liquid crystal display (LCD) device, the light comes in from the left side. If one curved profile of the reflective electrode is considered, the light comes in from a left side of the curved profile of the reflective electrode as shown in FIG. 7. Accordingly, the effective reflection area that can reflect the incident light toward the front of the reflective liquid crystal display is a surface of the curved profile of the reflective electrode on the left side of the curved profile with respect to the dotted line of FIG. 7. Thus, reflection efficiency is lower because a small area on one side of the curved profile is used.

In the case of the above process in FIGS. 6A to 6C, it is possible to reproduce the curved profiles but the process is complex due to the need to evenly or consistently deposit the second organic layer 74. Furthermore, the additional formation of the second insulating layer 74 on the first insulating layer 73 increases a total thickness of the insulating layer. Moreover, as in the case of FIGS. 5A to 5B, an interval between two neighboring organic film patterns 72 and a size of each organic film pattern 72 has to be carefully controlled to obtain a desired curved profile 73a for the first insulating layer 73. The consideration of the melting properties of the first insulating layer 73 together with the interval and the size of the organic film pattern 72 can cause reproducibility problems in terms of forming substantially equivalent curved profiles.

SUMMARY OF THE INVENTION

Accordingly, the present invention is directed to an array substrate of a reflective liquid crystal display (LCD) device and a manufacturing method for the same that substantially obviates one or more of the problems due to limitations and disadvantages of the related art.

An object of the present invention is to provide an array substrate in a reflective liquid crystal display (LCD) device for increasing the image luminance.

Another object of the present invention is to provide an array substrate in a reflective liquid crystal display (LCD) for increasing the reflection efficiency.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate of a reflective liquid crystal display device including gate and data lines on the substrate, a thin film transistor adjacent to where a gate line and a data line cross over each other, wherein the thin film transistor has a gate electrode, a source electrode and a drain electrode, a passivation layer with an uneven surface having curved profiles that are asymmetric over the thin film transistor, and an opaque conductive pixel electrode having a reflective surface with curved profiles that are asymmetric on the passivation layer.

In another aspect, an array substrate of a reflective liquid crystal display device includes gate and data lines on the substrate; a thin film transistor adjacent to where a gate line and a data line cross over each other, wherein the thin film transistor has a gate electrode, a source electrode and a drain electrode; a passivation layer with an uneven surface having curved profiles over the thin film transistor, wherein each curved profile has a first side that is flatter than a second side of the curved profile, and a pixel electrode on the passivation layer such that a reflective surface of the pixel electrode substantially follows contours of the first and second sides of the curved profile.

In another aspect, a manufacturing method for a substrate of a reflective liquid crystal display device includes forming gate and data lines on the substrate; forming a thin film transistor adjacent to where a gate line and a data line cross over each other, wherein the thin film transistor has a gate electrode, a source electrode and a drain electrode; forming a passivation layer over the thin film transistor, wherein the second passivation layer has an uneven surface having curved profiles that are asymmetric; and forming an opaque conductive pixel electrode having a reflective surface with curved profiles that are asymmetric on the passivation layer.

In another aspect, a method for manufacturing an array substrate of a reflective liquid crystal display device includes forming gate and data lines on the substrate; forming a thin film transistor adjacent to where a gate line and a data line cross over each other, wherein the thin film transistor has a gate electrode, a source electrode and a drain electrode; forming a passivation layer over the thin film transistor with an uneven surface having curved profiles, wherein each curved profile has a first side that is flatter than a second side of the curved profile; and forming a pixel electrode on the passivation layer such that a reflective surface of the pixel electrode substantially follows contours of the first and second sides of the curved profile.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the embodiments of the present invention, which is illustrated in the accompanying drawings.

Figure 1:
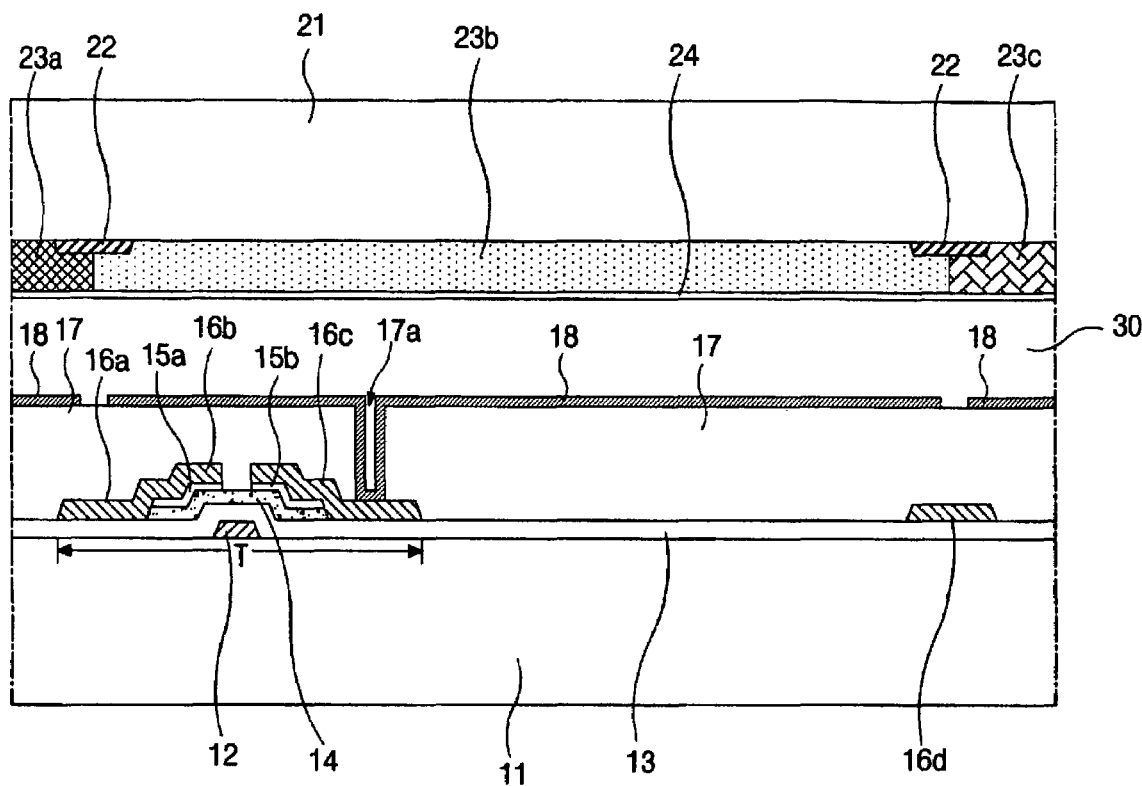
FIG. 1 is a cross-sectional view of a related art reflective liquid crystal display (LCD) device.
Figure 2:
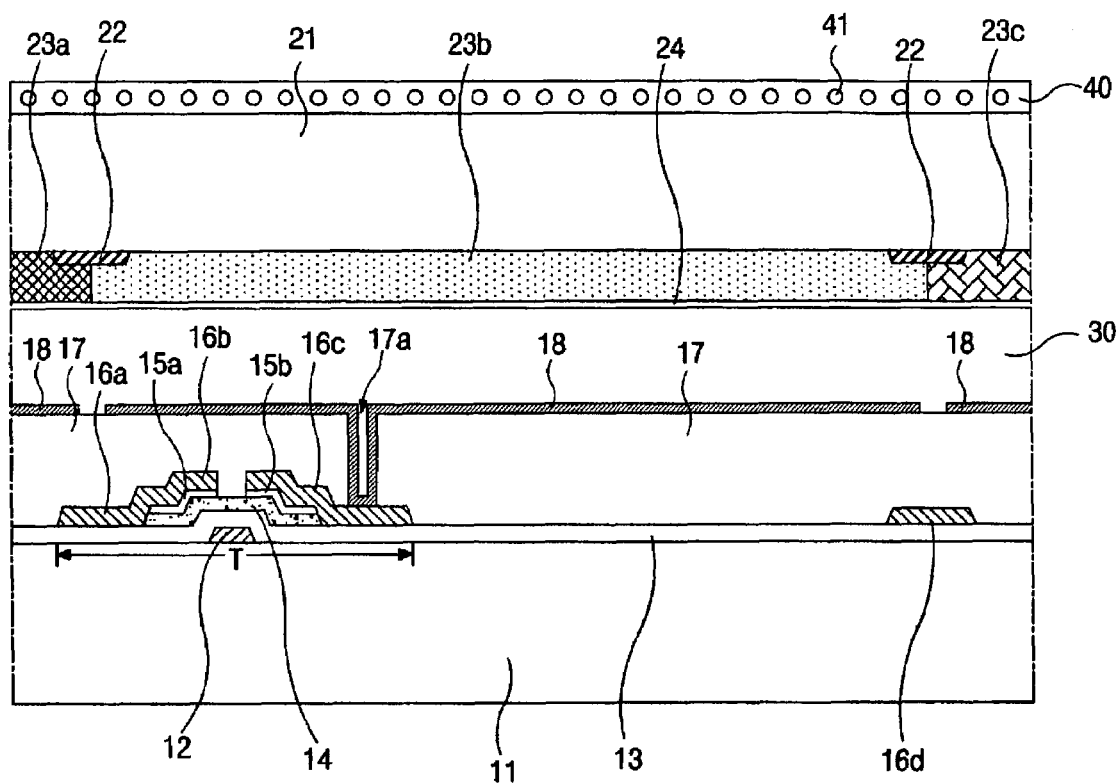
FIG. 2 is a cross-sectional view of a related art reflective liquid crystal display (LCD) device having a front scattering film.
Figure 3:
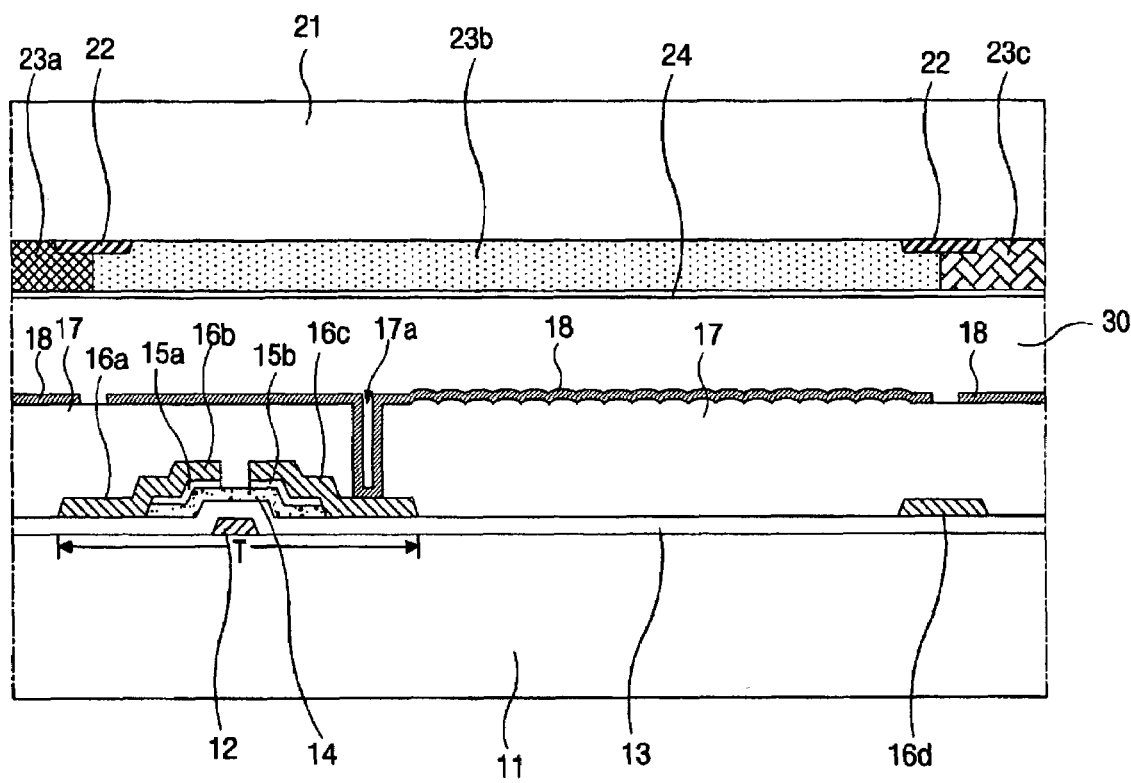
FIG. 3 is a cross-sectional view of a related art reflective liquid crystal display (LCD) device having an uneven surface of a reflective electrode.
Figure 4:
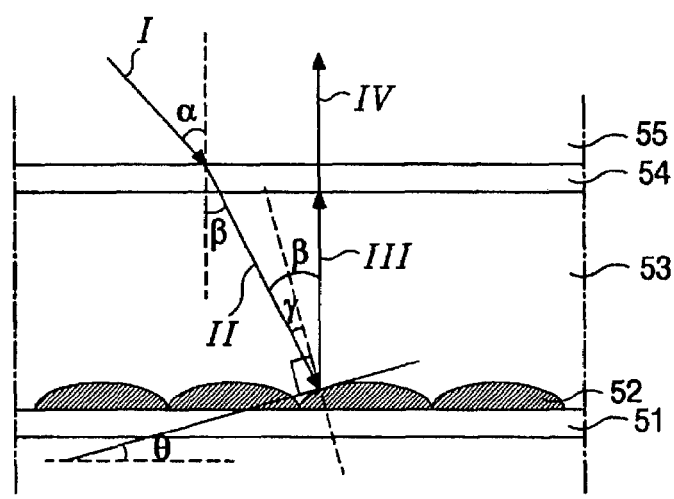
FIG. 4 is a graph illustrating light-paths and angles for the related art reflective liquid crystal display (LCD) device having the uneven surface of the reflective electrode.
Figure 5A:
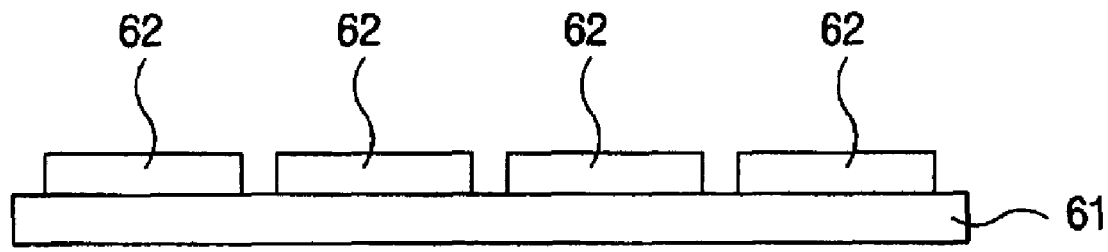
FIGS. 5A to 5B and FIGS. 6A to 6C are cross-sectional views illustrating a fabricating sequences for curved profiles of an organic insulating layer in a reflective liquid crystal display (LCD) device according to the related art.
Figure 5B:
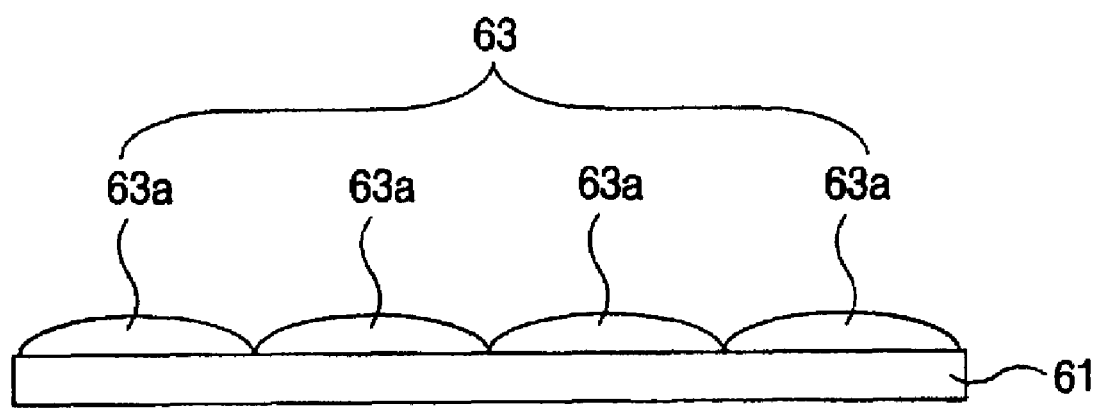
Figure 6A:
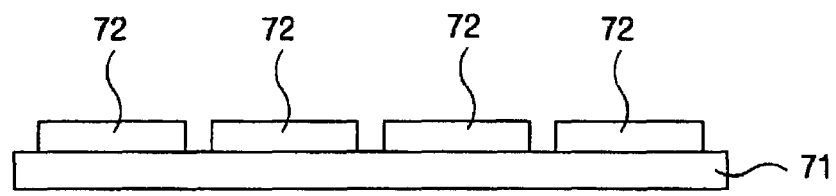
Figure 6B:
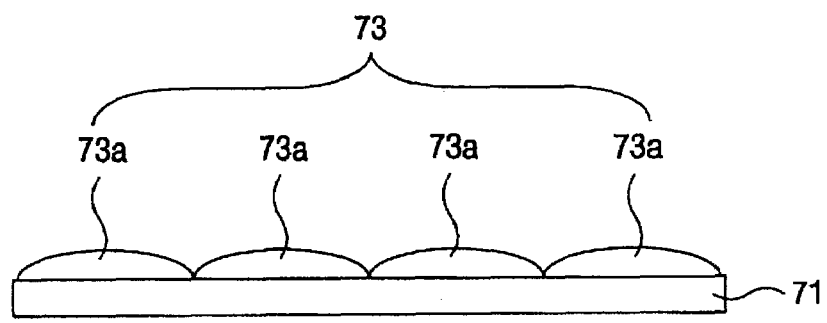
Figure 6C:
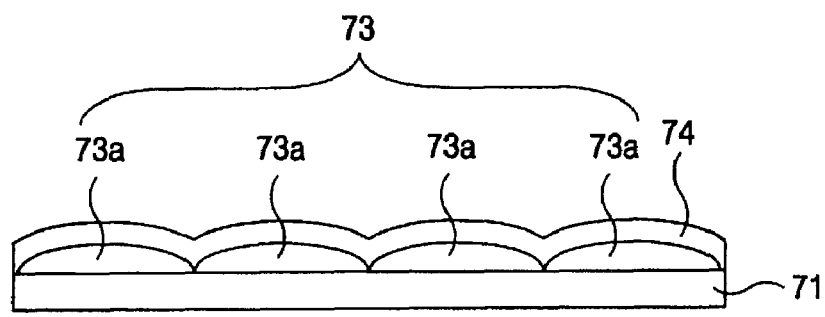
Figure 7:
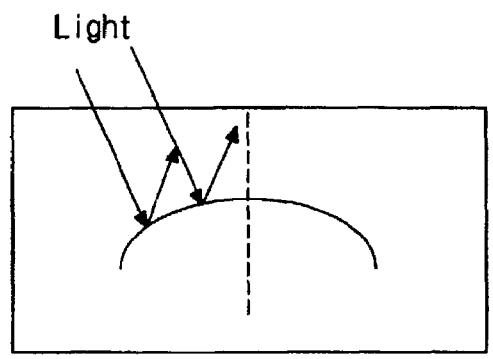
FIG. 7 is a graph illustrating an effective reflection area of a curved profile of a reflective electrode for a pixel liquid crystal display (LCD) device according to the related art.
Figure 8:
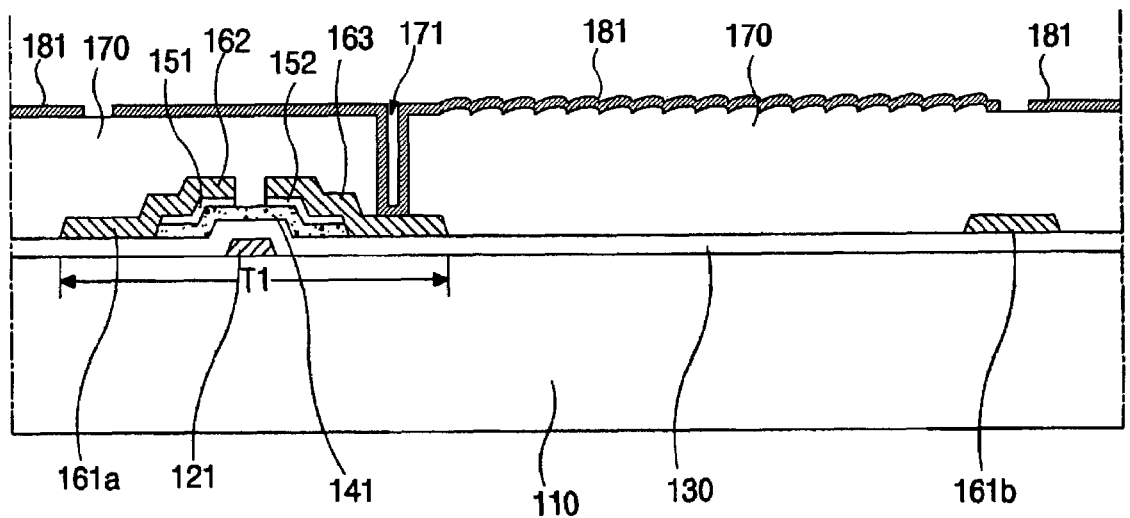
FIG. 8 is a cross-sectional view of an array substrate for a reflective liquid crystal display (LCD) device according to an embodiment of the present invention.

FIG. 8 is a cross-sectional view of an array substrate for a reflective liquid crystal display (LCD) device according to an embodiment of the present invention. In FIG. 8, a gate electrode 121 is formed of conductive material, such as a metal, on an insulating lower substrate 110. The insulating lower substrate is formed of, for example, glass, plastic, ceramic or some other material that can be formed to have a planar surface. A gate insulating layer 130 formed of inorganic insulating material, such as silicon nitride ($SiN_x$) or silicon oxide ($SiO_x$), is formed on the gate electrode 121 and the substrate 110. A gate line (not shown), which is connected to the gate electrode 121, is further formed beneath the gate insulating layer 130. An active layer 141 formed of, for example, amorphous silicon (a-Si:H) is formed over the gate electrode 121. Ohmic contact layers 151 and 152 formed of, for example, impurity doped amorphous silicon (n+ a-Si:H) are formed on sides of the active layer 141. Source electrode 162 and drain electrode 163 are formed on the ohmic contact layers 151 and 152, respectively. The source electrode 162 and drain electrode 163, which can be formed of metal, are spaced apart from each other. The gate electrode 121, the source electrode 162 and the drain electrode 163 are parts of a thin film transistor T1. A data line 161a, which is connected to the source electrode 162, is formed at the same time and with the same material as the source and drain electrode 162 and 163. More specifically, the thin film transistor is formed adjacent to where a gate line and a data line cross over each other.

A pixel region is defined between data lines 161a and 161b and gate lines (not shown) that cross the data lines. A passivation layer 170 is formed of, for example, an organic insulating material having a low dielectric constant. More specifically, the passivation layer is formed over both the lower substrate 110 and the thin film transistor T1. It is desirable to use organic insulating material having a low dielectric constant for the passivation layer 170. The passivation layer 170 has a contact hole 171 that exposes a portion of the drain electrode 163. An upper portion of the passivation layer 170 has an uneven pattern in the pixel region. A pixel electrode 181 is formed of an opaque conductive material, such as a metal, on the passivation layer 170. The pixel electrode 181 contacts the drain electrode 163 through the contact hole 171 and has an uneven surface because it is formed on the uneven surface of the passivation layer 170 such that it has the same contour as the uneven surface of the passivation layer 170.

The pixel electrode 181 serves as a reflector and can be formed of one of aluminum (Al), aluminum alloys, silver (Ag) or other materials that have a low specific resistance and a high reflectability. The pixel electrode 181 is formed above and overlapping the thin film transistor T1. Because the passivation layer 170 is formed of the organic insulating material having a low dielectric constant, signal interference between the pixel electrode 181 and the data lines 161a and 161b is prevented and thus the pixel electrode 181 can overlap the data line 161 to increase an aperture ratio.

As shown in FIG. 8, the pixel electrode 181 has a portion with a smooth surface directly above the thin film transistor T1 and another portion with an uneven surface of asymmetric curved profiles. More particularly, a radius of curvature for one side of an asymmetric curved profile in the pixel electrode 181 is larger than the radius of curvature for the other side of the asymmetric curved profile. This means that one side of the asymmetric curved profile is flatter than the other side of the asymmetric curved profile. Consequently, the asymmetric curved profile slopes upward from one side to the other. Most of the upward slope is at about an inclination angle that will increase the effective reflection area such that the luminance coming out from the front of a reflective liquid crystal display device in a direction perpendicular to the front of the reflective liquid crystal display is increased.

Figure 9A:
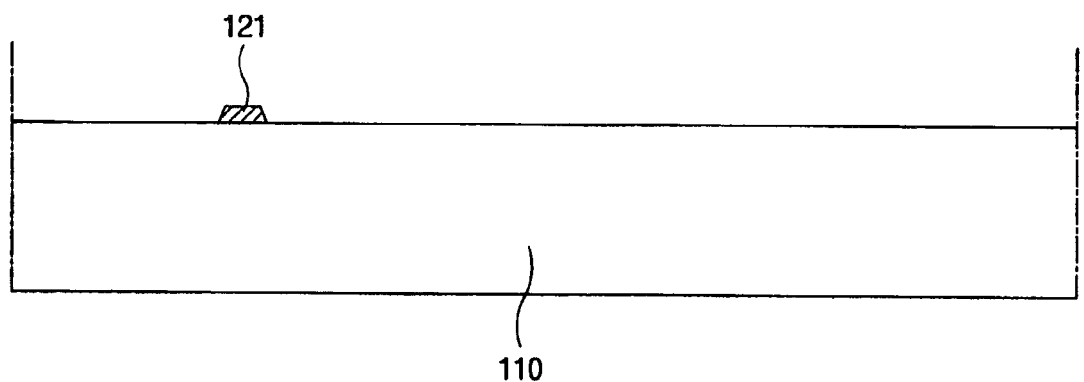
FIGS. 9A to 9E are cross-sectional views illustrating a fabricating sequence for an array substrate in a reflective liquid crystal display (LCD) device according to an embodiment of the present invention.

FIGS. 9A to 9E are cross-sectional views illustrating a fabricating sequence for an array substrate in a reflective liquid crystal display (LCD) device according to an embodiment of the present invention. In FIG. 9A, the gate electrode 121 is formed by depositing conductive material, such as a metal, on the substrate 110 and then patterning it. The gate line, which is connected to the gate electrode 121, is also formed at this time on the substrate 110 with the same material as that of the gate electrode 121. It is desirable that a metal material with a low specific resistance is used for the gate line (not shown) and the gate electrode 121 to prevent a signal delay.

Figure 9B:
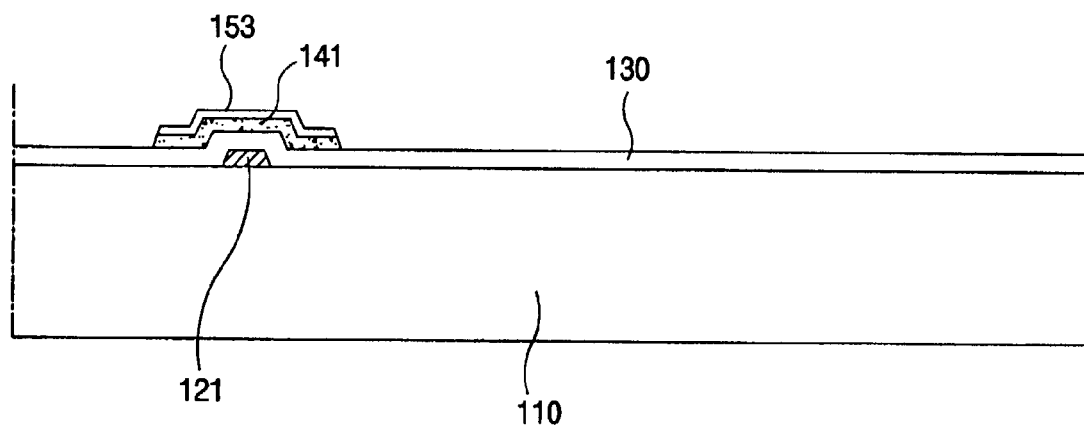

As shown in FIG. 9B, the gate insulating layer 130 is formed by depositing an inorganic insulating material, such as silicon nitride ($SiN_x$) or silicon oxide ($SiO_2$), on the whole substrate 110, gate line and the gate electrode 121. The active layer 141 and a semiconductor layer 153 are formed over the gate electrode 121 by sequentially depositing amorphous silicon (a-Si:H) and then impurity doped amorphous silicon (n+ a-Si:H or p+ a-Si:H) on the gate insulating layer 130 and patterning both of them.

Figure 9C:
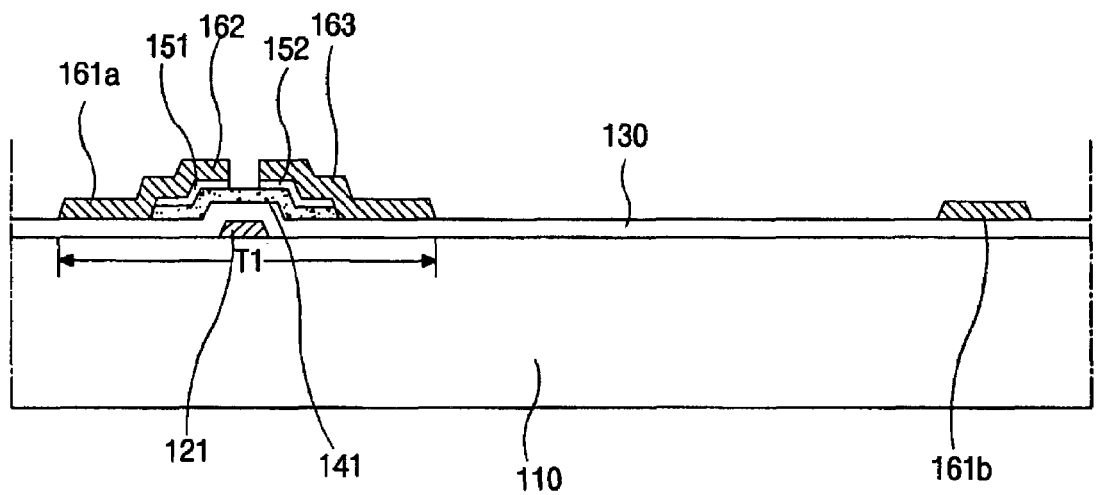

As shown in FIG. 9C, the data line 161a, the source electrode 162 and the drain electrode 163 are formed by depositing conductive material, such as a metal, on the whole substrate 110 and then patterning it. The ohmic contact layers 151 and 152 are formed by etching through the middle of the semiconductor layer 153 in FIG. 9B to expose the active layer 141. The data line 161a is connected to the source electrode 162. A pixel region is defined between data lines 161a and 161*b* and gate lines (not shown) that cross the data lines. The source electrode 162 and drain electrode 163 are parts of the thin film transistor T1 together with the gate electrode 121.

Figure 9D:
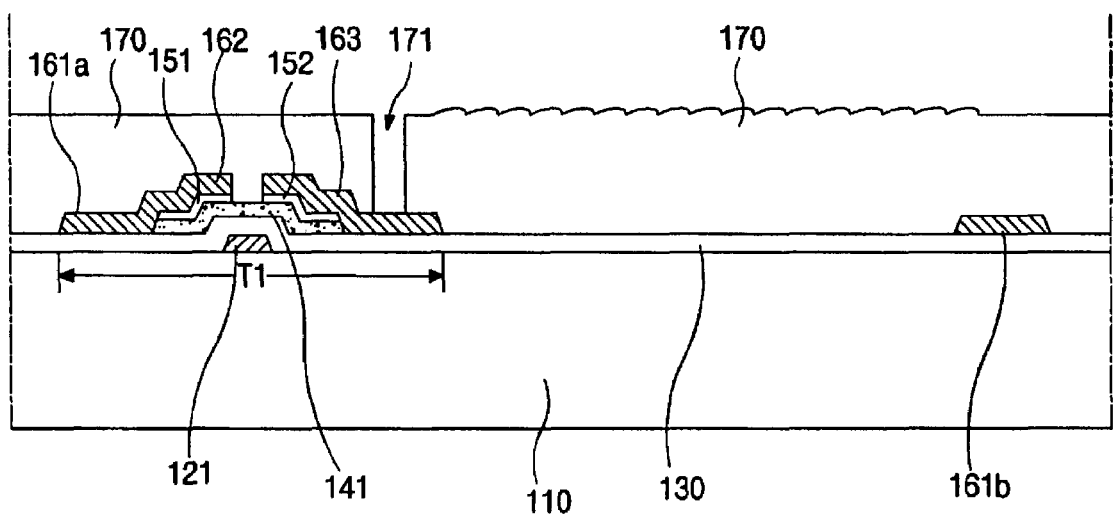

As shown in FIG. 9D, a passivation layer is formed by depositing organic insulating material over the entire substrate 110 including the thin film transistor T1. A contact hole 171 is formed in the passivation layer to expose a portion of the drain electrode 163. The passivation layer 170 has both an uneven surface portion and a smooth surface portion in the pixel region. The uneven surface has asymmetric curved profiles. The smooth surface portion of the pixel electrode 181 is formed directly above the thin film transistor T1. A method for forming the uneven surface of the pixel electrode 181 will be described in detail later in this specification. The passivation layer 170 is preferably formed of an organic insulating material that has a low dielectric constant.

Figure 9E:
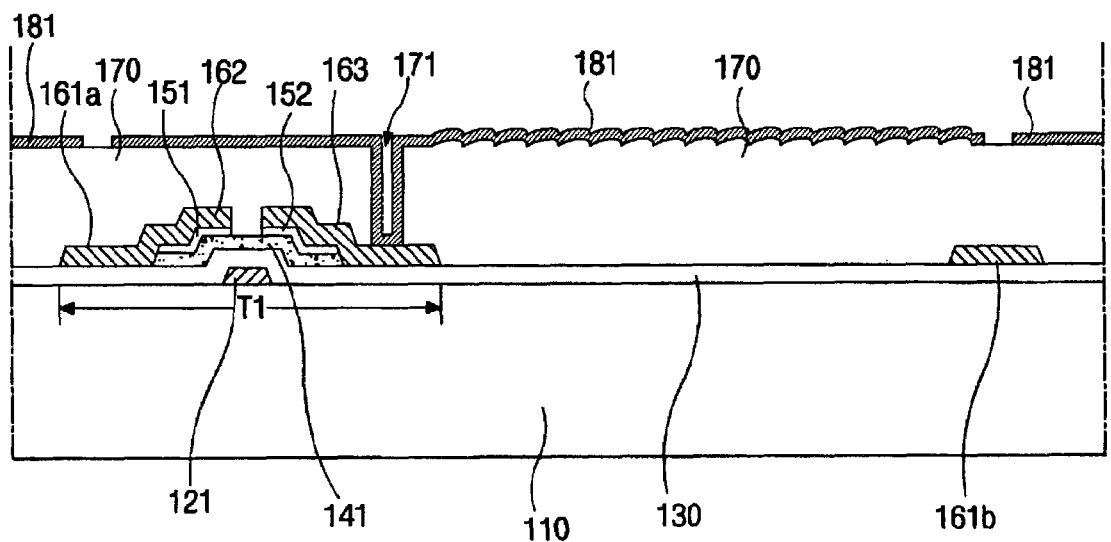

As shown in FIG. 9E, the pixel electrode 181 is formed by depositing a conductive material, such as a metal, on the passivation layer 170 and then patterning it. The pixel electrode 181 is connected to the drain electrode 163 through the contact hole 171. Because the pixel electrode 181 is formed on the uneven surface portion of the passivation layer 170, the pixel electrode 181 also has an uneven surface in the pixel region. Because signal interference does not occur due to the low dielectric constant of the passivation layer 170, the aperture ratio can be increased by overlapping the pixel electrode 181 with the data line 161*b*.

Figure 10A:
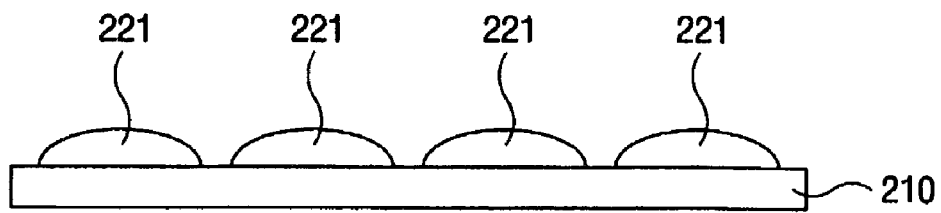
FIGS. 10A to 10D are cross-sectional views illustrating a fabricating sequence of curved profiles of a passivation layer and a pixel electrode for a reflective liquid crystal display (LCD) device according to an embodiment of the present invention.

FIGS. 10A to 10D are cross-sectional views illustrating a fabricating sequence for curved profiles of the passivation layer and the pixel electrode in a reflective liquid crystal display (LCD) device according to an embodiment of the present invention. As shown in FIG. 10A, a plurality of symmetrically curved bumps 221 is formed by depositing an organic material on a substrate 210, patterning the organic material into strips, melting the strips using heat and then curing them. The bumps 221 may be formed by processing an upper portion of the passivation layer 170 of FIG. 8 to have lands and grooves in which the lands are subsequently melted. In the alternative, additional organic insulating material is deposited on the passivation layer 170 of FIG. 8 as strips and then the strips are subsequently melted.

Figure 10B:
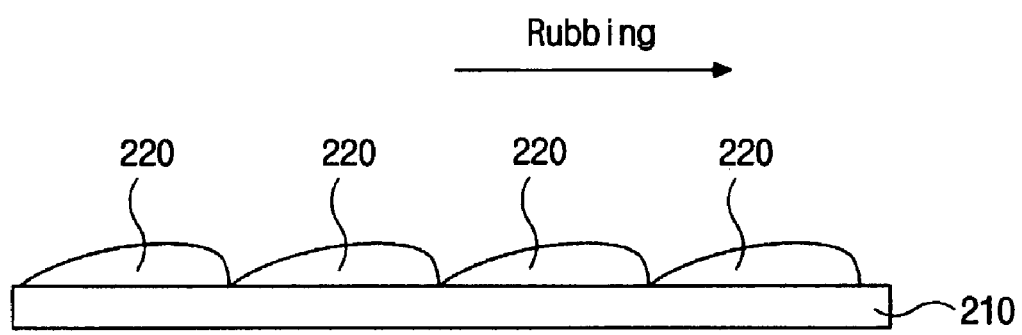
Figure 10C:
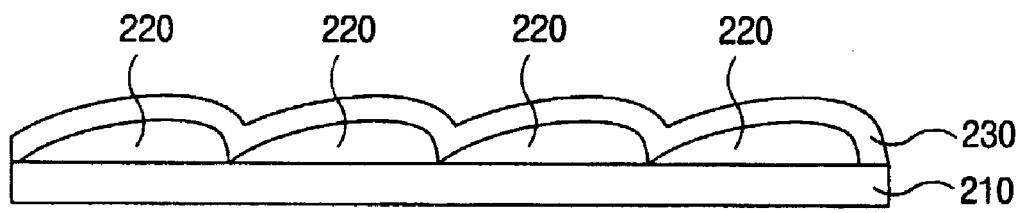
Figure 10D:
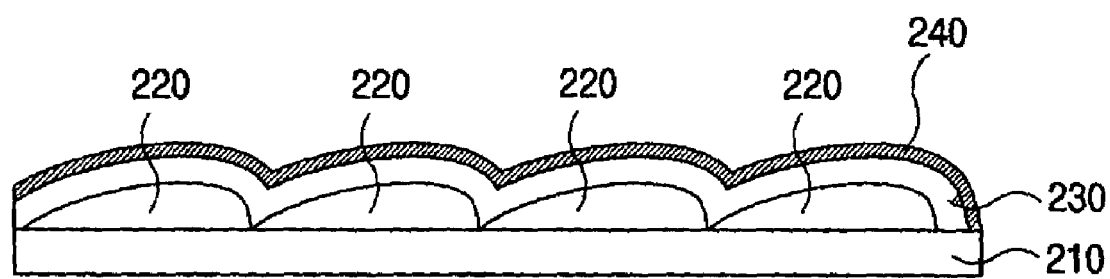

As shown in FIG. 10B, a surface of the plurality of symmetrically curved bumps 221 is rubbed from the left to the right to flatten a left side of the bumps 221. That is, the left side of the bump 221 is pushed over by the rubbing such that a resulting pushed-over curved profile 220, which slopes upward from left to right, is formed. Accordingly, the pushed-over curved profile 220 is asymmetric. As shown in FIG. 10C, an insulating layer 230 is formed by coating an organic insulating material on the pushed-over curved profiles 220 to somewhat compensate for the pushed-over curved profiles 220. That is, the additional insulating layer 230 is formed on the pushed-over curved profiles 220 such that the insulating layer 230 has an upper surface that is smoother than the surface of the pushed-over curved profiles 220. As shown in FIG. 10D, a pixel electrode 240 is formed by depositing opaque conductive material, such as metal, on the insulating material 230. The pixel electrode 240 has a substantially uniform thickness. Accordingly, the pixel electrode 240 has an upper surface that substantially follows contours of the smoothed pushed-over curved profile surface of the insulating layer 230. In the alternative, if the pushed-over curved profiles 220 form an upper surface that is sufficiently smooth after the step of rubbing, the deposition of the insulating layer 230 can be omitted such that the pixel electrode 240 is deposited directly on the pushed-over curved profiles 220. Further, the deposition of the insulating layer 230 can be omitted if the opaque conductor will be deposited with a thickness that is not substantially uniform in thickness such that the opaque conductor has an upper surface that is smoother than the surface of the pushed-over curved profiles 220.

Figure 11:
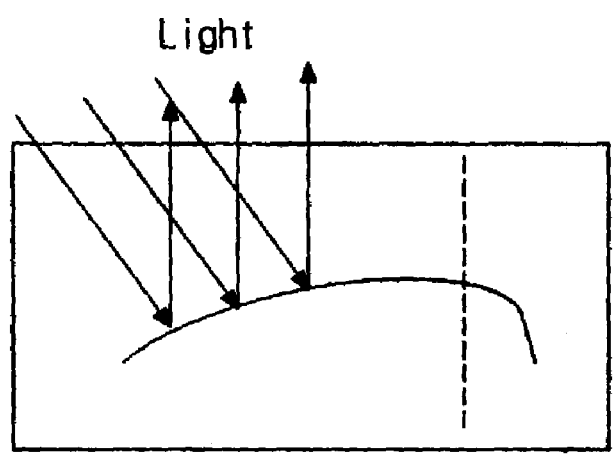
FIG. 11 is a graph illustrating an effective reflection area of a curved profile of the pixel electrode surface for the reflective liquid crystal display (LCD) device according to an embodiment of the present invention.

FIG. 11 is a graph illustrating an effective reflection area of a curved profile of the pixel electrode surface for the reflective liquid crystal display (LCD) device according to an embodiment of the present invention. As shown in FIG. 11, one side of the curved profile is less steep than the other side of the curved profile. That is, the curved profile slopes upward from the left side of a dotted line of FIG. 11 to the right side of the dotted line of FIG. 11. Accordingly, if light comes into the curved profile of the reflective electrode from the left of the FIG. 11, an effective reflection area that can reflect the incident light toward the front of the reflective liquid crystal display is larger than that of the related art in which the curved profile is symmetric with respect to a centerline of the curved profile. The increase of the effective reflection area increases the luminance coming out from the front of a reflective liquid crystal display device in a direction perpendicular to the front of the reflective liquid crystal display device.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. An array substrate of a reflective liquid crystal display device, comprising:
    gate and data lines on the substrate;
    a thin film transistor adjacent to where a gate line and a data line cross over each other to define a pixel region, the thin film transistor has a gate electrode, a source electrode, and a drain electrode;
    a passivation layer directly on the thin film transistor, the passivation layer formed with an uneven surface having a continuous series of convex curved profiles that are asymmetric and a flat surface, wherein at least some of the converge to form a point, the passivation layer including an organic material, wherein the uneven surface corresponds to the pixel region and the flat surface corresponds to the thin film transistor, and wherein the continuous series of convex curved profiles have substantially the same size as each other; and
    an opaque conductive pixel electrode formed directly on the passivation layer, the pixel electrode having a reflective surface with curved profiles that are asymmetric,
    wherein a radius of curvature for one side of each curved profile of the pixel electrode is larger than a radius of curvature of the other side of each curved profile of the pixel electrode.

2. The array substrate according to claim 1, wherein the opaque conductive pixel electrode has an uneven surface with curved profiles that are asymmetric in a manner that is substantially the same as the asymmetric curved profiles of the passivation layer.

3. The array substrate according to claim 1, wherein a portion of the pixel electrode overlaps a portion of the data line.

4. The array substrate according to claim 1, wherein the pixel electrode has an upper surface that is smoother than the uneven surface of the passivation layer.

5. The array substrate according to claim 1, wherein the pixel electrode is formed of one of aluminum (Al), aluminum alloys and silver (Ag).

6. An array substrate of a reflective liquid crystal display device, comprising:

gate and data lines on the substrate;

a thin film transistor adjacent to where a gate line and a data line cross over each other to define a pixel region, wherein the thin film transistor has a gate electrode, a source electrode, and a drain electrode;

a passivation layer directly on the thin film transistor, the passivation layer formed with an uneven surface having a continuous series of convex curved profiles and a flat surface, wherein each curved profile has a first side that is flatter than a second side of the curved profile, wherein at least some of the convex curved profiles converge to form a point, wherein the passivation layer includes an organic material, wherein the uneven surface corresponds to the pixel region and the flat surface corresponds to the thin film transistor, and wherein the continuous series of convex curved profiles have substantially the same size as each other; and a pixel electrode formed directly on the passivation layer such that a reflective surface of the pixel electrode substantially follows contours of the first and second sides of the curved profile, wherein a radius of curvature for one side of the pixel electrode following the contour is larger than a radius of curvature of the other side of the pixel electrode following the contour.

7. The array substrate according to claim 6, wherein a portion of the pixel electrode overlaps a portion of the data line.

8. The array substrate according to claim 6, wherein the pixel electrode overlaps the source and drain electrodes.

9. The array substrate according to claim 6, wherein the pixel electrode is formed of one of aluminum (Al), aluminum alloys and silver (Ag).

10. An array substrate of a reflective liquid crystal display device, comprising:

gate and data lines on the substrate;

a thin film transistor adjacent to where a gate line and a data line cross over each other to define a pixel region, wherein the thin film transistor has a gate electrode, a source electrode, and a drain electrode;

a passivation layer directly on the thin film transistor, the passivation layer formed with an uneven surface having asymmetric curved profiles and a flat surface, wherein at least some of the asymmetric curved profiles converge to form a point, the passivation layer including an organic material, wherein the uneven surface corresponds to the pixel region and the flat surface corresponds to the thin film transistor, and wherein the asymmetric curved profiles have substantially the same size as each other; and an opaque conductive pixel electrode formed directly on the passivation layer, the pixel electrode having a reflective surface with asymmetric curved profiles such that most of the light incident on the reflective surface is reflected in a direction substantially normal to the substrate, wherein a radius of curvature for one side of each asymmetric curved profile of the pixel electrode is larger than a radius of curvature of the other side of each asymmetric curved profile of the pixel electrode.

11. The array substrate according to claim 10, wherein the opaque conductive pixel electrode has an uneven surface with curved profiles that are asymmetric in a manner that is substantially the same as the asymmetric curved profiles of the passivation layer.

12. The array substrate according to claim 10, wherein a portion of the pixel electrode overlaps a portion of the data line.

13. The array substrate according to claim 10, wherein the pixel electrode has an upper surface that is smoother than the uneven surface of the passivation layer.

14. The array substrate according to claim 10, wherein the pixel electrode is formed of one of aluminum (Al), aluminum alloys and silver (Ag).

* * * * *